United States Patent
Kaczynski et al.

(10) Patent No.: US 7,475,762 B2
(45) Date of Patent: Jan. 13, 2009

(54) AIRCRAFT WHEEL PART HAVING IMPROVED CORROSION RESISTANCE

(75) Inventors: David K. Kaczynski, South Bend, IN (US); Jimmy C. Chan, Granger, IN (US); Martin S. Day, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 513 days.

(21) Appl. No.: 10/943,518

(22) Filed: Sep. 17, 2004

(65) Prior Publication Data

US 2005/0264090 A1 Dec. 1, 2005

Related U.S. Application Data

(60) Provisional application No. 60/573,839, filed on May 25, 2004.

(51) Int. Cl.
*F16F 9/00* (2006.01)
(52) U.S. Cl. ............ 188/382; 188/18 A; 301/6.2; 427/142; 427/422
(58) Field of Classification Search ............ 188/218 XL, 188/382, 18 A, 71.5; 301/6.2, 6.1, 6.91; 427/352, 142, 421.1, 287, 405, 419.7
See application file for complete search history.

(56) References Cited

U.S. PATENT DOCUMENTS

| | | | |
|---|---|---|---|
| 4,537,632 A | 8/1985 | Mosser | |
| 4,564,555 A | 1/1986 | Hornberger | |
| 4,606,967 A | 8/1986 | Mosser | |
| 5,015,290 A * | 5/1991 | Tiegs et al. | 75/232 |
| 5,310,605 A * | 5/1994 | Baldoni et al. | 428/569 |
| 5,931,269 A | 8/1999 | Detwiler et al. | |
| 6,004,372 A | 12/1999 | Quets | |
| 6,634,781 B2 * | 10/2003 | Bowens et al. | 366/79 |
| 6,884,470 B2 * | 4/2005 | Gorman | 427/448 |
| 6,893,551 B2 * | 5/2005 | Krishna et al. | 205/316 |

FOREIGN PATENT DOCUMENTS

| | | |
|---|---|---|
| EP | 0 526 670 A1 | 2/1993 |
| EP | 0 927 774 A1 | 7/1999 |

OTHER PUBLICATIONS

Sermatech Spotlite (Summer 2004) www.sermatech.com.
Fabiny, William J., "Aluminum Ceramic Slurry Coating System for Corrosion Protection in Offshore Atmospheric Environments," National Association of Corrosion Engineers, Corrosion/2004, Paper No. 04025.

* cited by examiner

*Primary Examiner*—Robert A Siconolfi
*Assistant Examiner*—Mariano Sy
(74) *Attorney, Agent, or Firm*—Birch, Stewart, Kolasch & Birch, LLP

(57) ABSTRACT

A steel member (10) having wear and corrosion resistance through a combination of coatings is disclosed, the steel member (10) being a hardened and tempered steel member having a high tensile strength, at least one selected portion (18) of the steel member (10) coated by thermal spraying with a tungsten carbide-cobalt composition (22) to provide wear and corrosion resistance, the tungsten carbide-cobalt composition (22) being approximately 78-90% tungsten carbide and approximately 10-19% cobalt, and a sacrificial ceramic-metallic coating (24) on the steel member (10) to provide corrosion resistance for the steel member (10). A method of coating a steel member (10) is also disclosed.

2 Claims, 4 Drawing Sheets

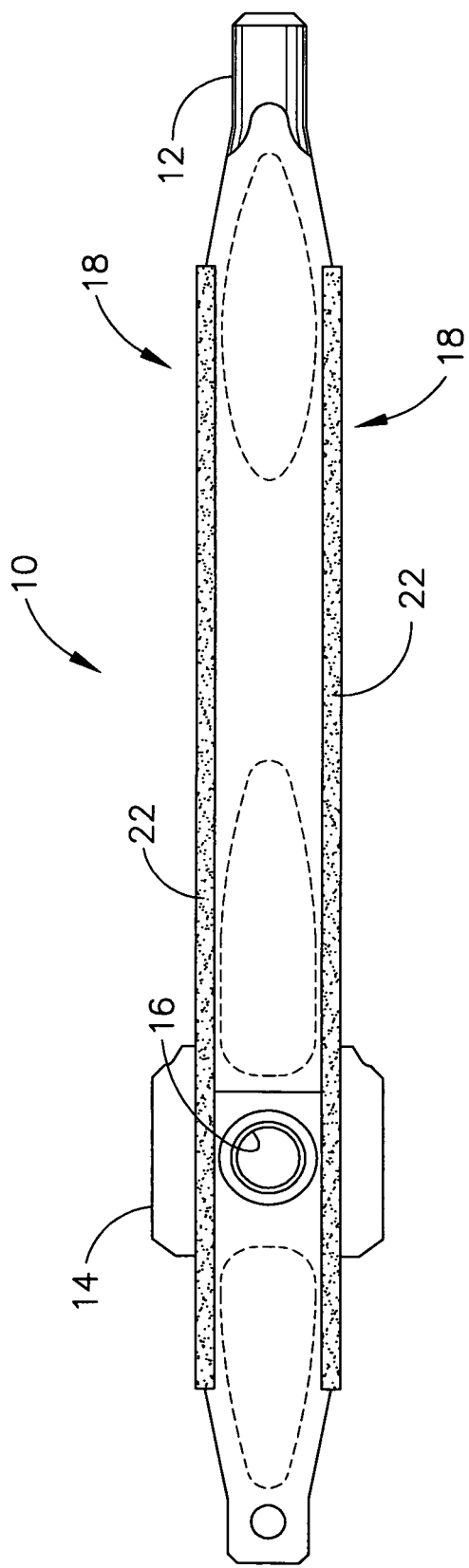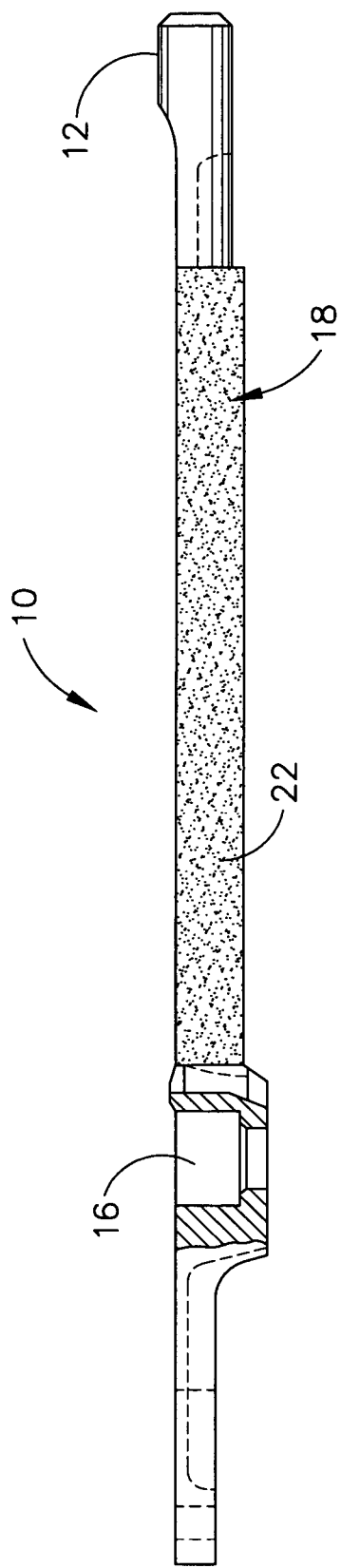

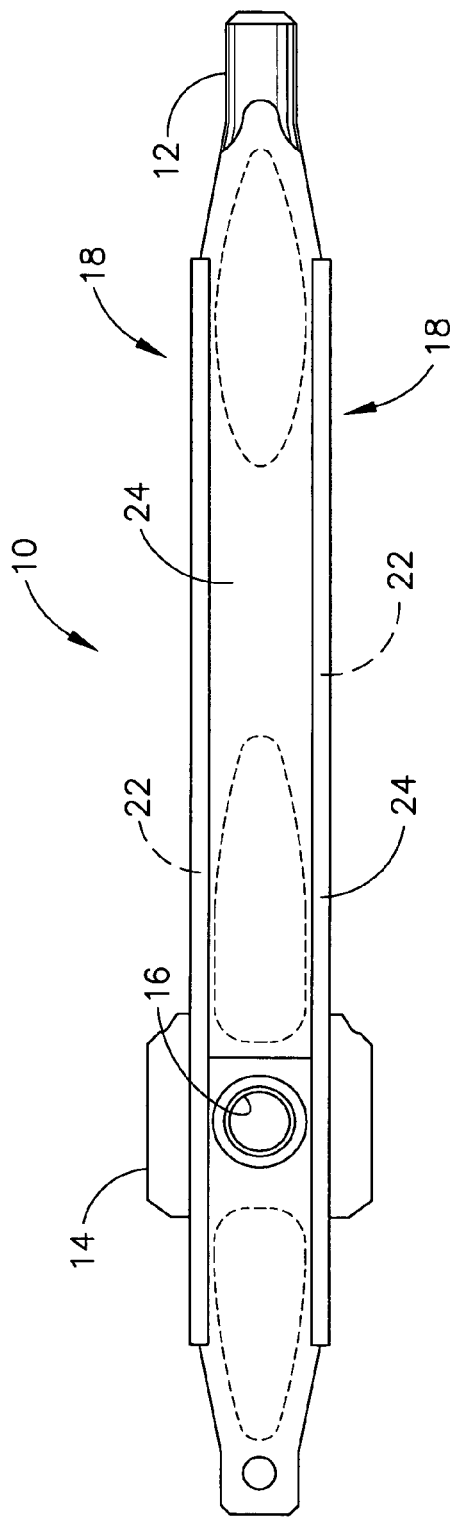
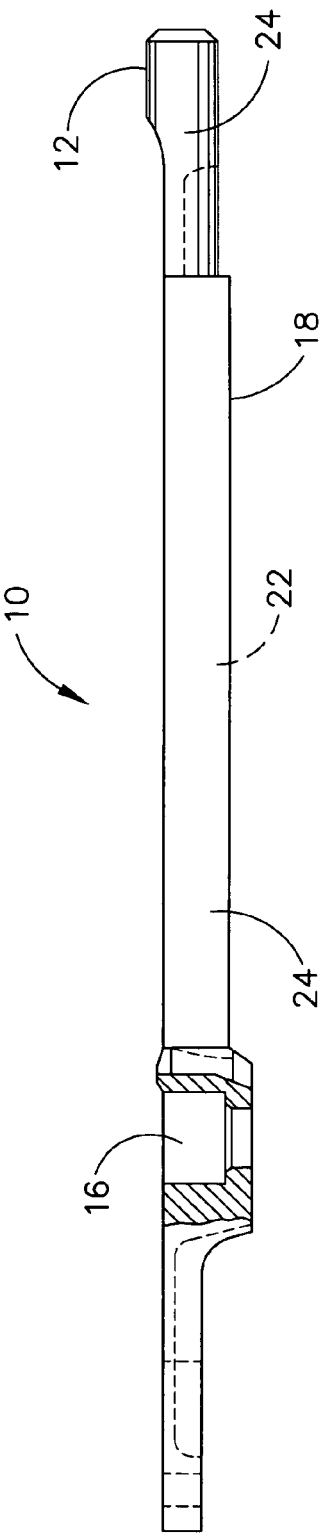
FIG. 3
FIG. 4

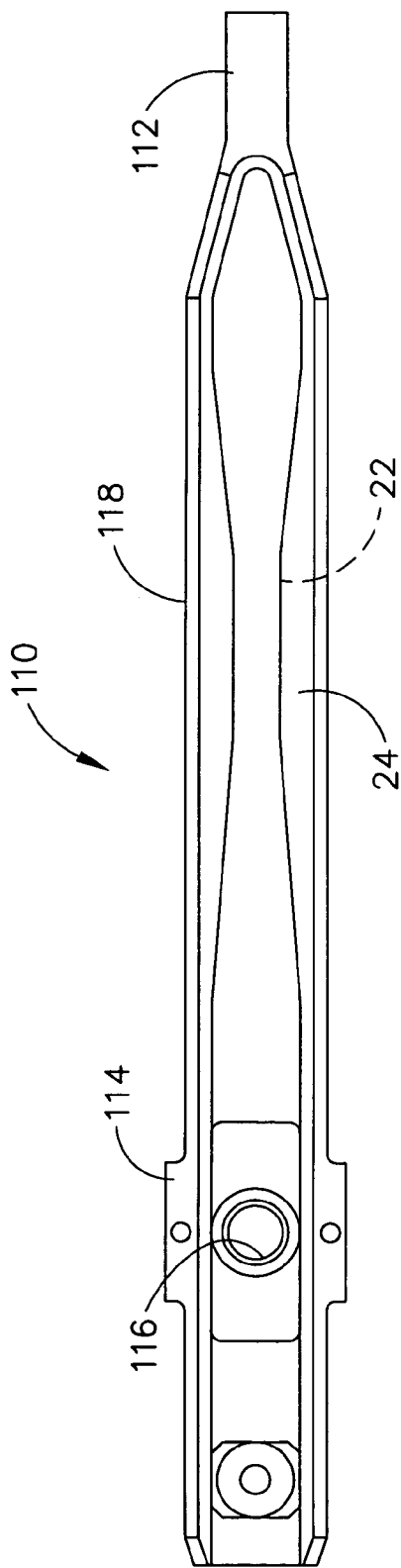
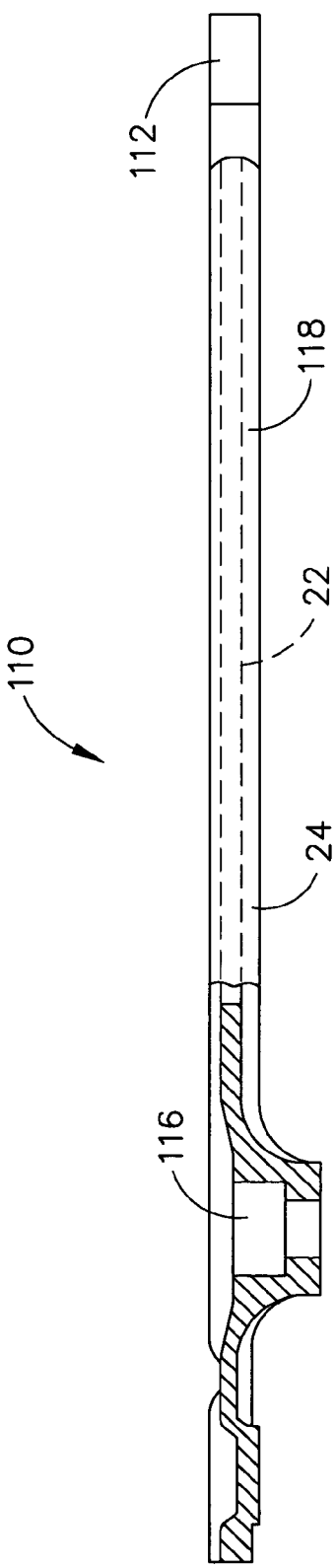
FIG. 5
FIG. 6

AIRCRAFT WHEEL PART HAVING IMPROVED CORROSION RESISTANCE

CROSS REFERENCE TO RELATED APPLICATIONS

The present application claims the benefit of U.S. Provisional Patent Application No. 60/573,839, filed May 25, 2004, the entire contents of which are hereby incorporated by reference.

FIELD OF THE INVENTION

The present invention is directed to an aircraft wheel component having improved corrosion resistance, and, more specifically, to a wear-resistant aircraft wheel rotor drive key having side rails coated with tungsten carbide and a ceramic-metallic coating.

BACKGROUND OF THE INVENTION

Aircraft wheels may include separate drive key members that are attached by bolts to a wheel. The drive key members are engaged by rotors of an aircraft brake. During braking, the drive keys must withstand substantial braking torque as the brake rotors engage the brake stators. The drive key members may be made from hardened and tempered steel to provide a high tensile strength, or a nickel alloy such as Inconel. Inconel drive keys have an inherent corrosion resistance, but are significantly (two to three times) more expensive than steel drive keys. Steel drive keys, while only a fraction of the cost of Inconel drive keys, are subject to corrosion which can result in cracking and failure of the steel.

In some brake systems, steel drive key members are coated with a chromium plating which provides an adequate degree of protection in certain environments. The cost of chromium plating is also low enough that it provides a cost advantage over alloys such as Inconel. However, when carbon-carbon composite brake discs are used in such systems, carbon dust from the brake discs reacts with the chromium plated steel drive keys due to the inherent microcracking in the chromium plating and impairs the effectiveness of the coating. Once the coating is breached, water, cleaning agents and de-icers, for example, may reach the steel member and cause corrosion. The subsequent corrosion plus the high stresses to which the drive keys are subjected results in stress corrosion cracking and may lead to a failure of the drive key.

One way of addressing this problem is by coating the drive key with an electroless nickel plating that forms a barrier over the steel and tungsten carbide coating on the side rails which insulates the steel from the carbon dust. This method may be more expensive than using chrome, but still provides a cost advantage over alloys such as Inconel. Such a method is described, for example, in U.S. Pat. No. 5,931,269 entitled "Aircraft Wheel Part With Corrosion and Wear Resistance," the disclosure of which is hereby incorporated by reference.

It has been found, however, that the electroless nickel coating can be damaged by the stresses applied to the drive keys during use and/or by the scraping of the rotor mounting elements against the drive keys when the rotors are removed for repair or replacement. Once the coating is breached, carbon dust from carbon-carbon brakes reaches the steel beneath the coating and begins to corrode the steel. Repairing electroless nickel is also environmentally unfriendly, time consuming and expensive. Thus, while electroless nickel provides benefits over chromium coatings, it still provides fewer benefits than expensive alloys such as Inconel. It is therefore desirable to provide a steel member, suitable for use as an aircraft wheel rotor drive key, that exhibits corrosion resistance similar to that exhibited by expensive alloys but at a significantly lower cost.

SUMMARY OF THE INVENTION

This problem and others are addressed by the present invention which comprises, in a first aspect, an aircraft wheel rotor drive key having an elongated steel body portion including side portions for engaging a rotor insert. The side portions are coated with a tungsten-carbide cobalt composition to provide wear resistance and the body portion is coated with a ceramic-metallic coating composition.

Another aspect of the invention comprises a method of increasing the wear resistance and corrosion resistance of an aircraft wheel steel drive key that involves the steps of coating a first portion of the drive key with a tungsten-carbide cobalt composition to provide wear resistance and coating a second portion of the drive key with a ceramic-metallic composition to provide corrosion resistance.

A further aspect of the invention comprises a steel member having wear and corrosion resistance through a combination of coatings, the steel member being a hardened and tempered steel member having a high tensile strength. At least one selected portion of the steel member is coated by thermal spraying with a tungsten carbide-cobalt composition to provide wear and corrosion resistance. The tungsten carbide-cobalt composition is made up of approximately 78-90% tungsten carbide and approximately 10-19% cobalt, and a sacrificial ceramic-metallic coating is provided on the steel member to provide corrosion resistance for the steel member.

An additional aspect of the present invention is a process for providing a steel member having corrosion and wear resistance through a combination of coatings. The process includes the steps of cleaning a steel member to remove undesirable materials therefrom and thermally spraying the steel member with a tungsten carbide-cobalt composition to provide a coating of tungsten carbide-cobalt. The tungsten carbide-cobalt composition comprises approximately 78-90% tungsten carbide and approximately 10-19% cobalt. The steel member is then cleaned, and a sacrificial ceramic-metallic coating is applied to the steel member. The tungsten carbide-cobalt coating provides wear and corrosion resistance and the ceramic-metallic coating provides corrosion resistance for the steel member.

BRIEF DESCRIPTION OF THE DRAWINGS

The present invention will be better understood after a reading of the following detailed description of embodiments thereof in connection with the following drawings, wherein:

FIG. 1 is a top view of a drive key for an aircraft wheel having side portions coated with tungsten carbide;

FIG. 2 is a partial cross section of the drive key of FIG. 1;

FIG. 3 is a top view of the drive key of FIG. 1 after being coated with a ceramic-metallic coating;

FIG. 4 is a partial cross section of the drive key of FIG. 3;

FIG. 5 is a top view of a second embodiment of drive key for an aircraft wheel;

FIG. 6 is a partial cross section of the drive key of FIG. 5; and

DETAILED DESCRIPTION

Figure 7:
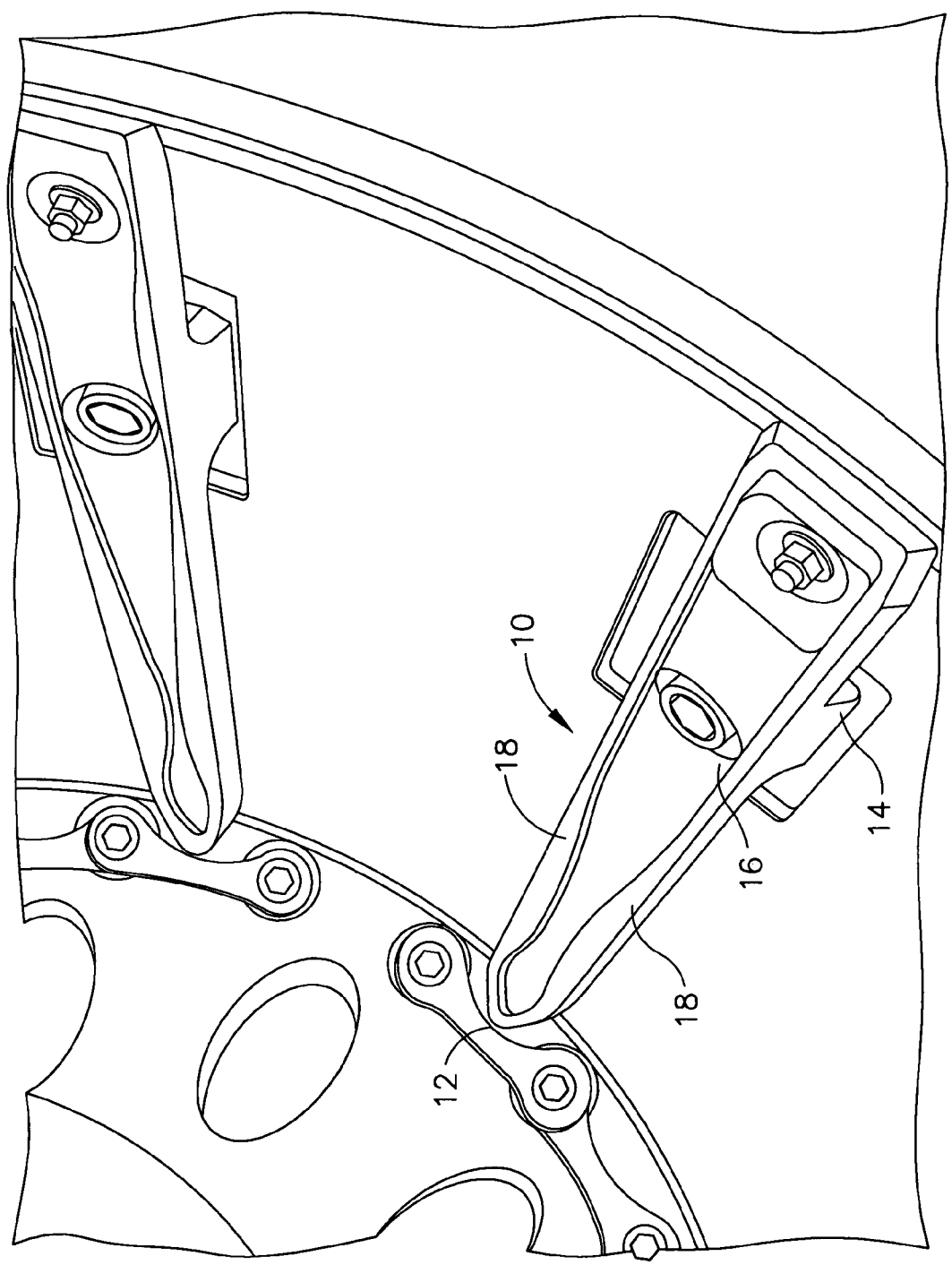
FIG. 7 is a perspective view of the drive key of FIG. 5 mounted on an aircraft wheel.

The present inventors have discovered that an aircraft wheel rotor drive key having tungsten carbide cobalt coated side portions can be further coated with a ceramic-metallic composition to provide sacrificial protection for the underlying steel drive key without adversely affecting the properties of the tungsten carbide cobalt coating. Moreover, this can be done at a cost that is still significantly less than the cost of an expensive alloy such as Inconel for the rotor drive key.

Referring now to the drawings, wherein the showings are for purposes of illustrating embodiments of the invention only, and not for the purpose of limiting same, FIG. 1 illustrates an aircraft wheel rotor drive key designated generally by reference numeral 10 that includes an inboard end extension 12 which is received within a hole at the inboard side of the wheel, and an outboard engagement portion 14 which engages the surface of the wheel and includes a through bolt hole opening 16 through which extends a bolt which in combination with a nut attaches the drive key to the aircraft wheel. Alternatively, the drive key can be attached to the wheel by means of two openings and bolts and nuts.

In an aircraft wheel and brake system, the side portions designated generally by reference numerals 18 are engaged by inserts located at the periphery of rotors of the aircraft brake. The rotors and stators of the aircraft brake are aligned axially along the length of the drive key 10, such that the inserts of the rotors engage the side portions 18.

One feature of the present invention provides the desired wear resistance and improved corrosion resistance necessary for a steel drive key to be utilized, without subsequent stress cracking and failure, in a carbon brake having carbon-carbon composite brake discs. Steel drive keys, made for example from H-11 alloy steel forgings, are initially cleaned in order to remove dirt, oxides, grease and other material that may interfere with a coating process. If desired, masking can be applied to the steel drive key in order to apply selectively a tungsten carbide coating to a selected area or areas of the drive key. Depending on how the tungsten carbide coating is applied and according to the size of the area desired to be coated, masking may not be necessary. As shown in FIGS. 1 and 2, the side areas 18 are covered with a tungsten carbide coating 22 which provides the desired wear resistance for the steel drive key. The side portions 18 with the coating 22 will be engaged by drive inserts located about the periphery of the rotors of the carbon brake. The tungsten carbide coating 22 may be applied in different forms, such as the two example forms listed below:

| Constituent | Type I | Type II |
| --- | --- | --- |
| Tungsten Carbide | 88% +/− 2% | 80% +/− 2% |
| Cobalt | 12% +/− 2% | 17% +/− 2% |
| Others | 2.5% max | 2.5% max |

The "Others" constituent typically may comprise oxides present from the manufacture of the powder.

In this embodiment, the tungsten carbide coating 22 is applied by means of a thermal spraying using high velocity oxygen-fueled equipment to produce a coating with less than 1% apparent porosity and a bond strength of approximately 10,000 psi minimum. The thickness of the sprayed coating is according to the desired application.

Next, the tungsten carbide coated drive key 10 is cleaned and prepared, by standard procedures, and coated with one or more layers of a ceramic-metallic material 24. A suitable material and application method are disclosed in U.S. Pat. Nos. 4,537,632 and 4,606,967, each entitled "Spherical Aluminum Particles in Coatings," the disclosures of which are hereby incorporated by reference. The preferred coating method is referred to by the owner of these patents, Sermatech International Incorporated of Limerick, Pa., as "SermeTel Process 6F-1."

Preferably, a base coat of the ceramic-metallic coating, about 0.8 mils thick, is first applied to the drive key including the side rails 18 and then cured at a temperature of about 650 degrees F. The coated drive key is shown in FIGS. 3 and 4. Although it is not necessary to provide the ceramic-metallic coating 24 over the side portions 18 coated previously with tungsten carbide, the process is simplified and cost reduced by simply providing the ceramic-metallic coating 24 over the entire drive key 10. Subsequently during use, the ceramic-metallic coating 24 will wear away from the tungsten carbide coating 22 on the side rails 18 but remain in place over the steel body of the drive key 10. This is acceptable because the purpose of the tungsten carbide coating 22 is to provide wear resistance while the ceramic-metallic coating 24 is used to provide improved corrosion resistance for areas not coated by tungsten carbide. A sealer/top coat layer about 0.2 mils thick is then applied over the base coat and cured at a temperature of about 650 degrees F. A suitable sealer is a chromate/phosphate coating such as described in U.S. Pat. No. 4,537,632.

Among the advantages of the above described coating are its ease of application and the fact that it can be repaired more economically that other coatings. Rotor drive keys coated with ceramic-metallic coatings and sustaining minor damage to the coating can be repaired by operators on site, possibly without removing the rotor drive key from the wheel. Previously, drive keys had to be removed and shipped offsite for stripping and recoating. Thus, the small additional original cost of ceramic-metallic coated drive keys is offset by cost savings the first time repair is required, leading to a lower overall lifetime cost of the part. Furthermore, the coating appears to have no negative fatigue impact on the drive keys.

FIGS. 5 and 6 illustrate a second embodiment of a rotor drive key 110 that includes an inboard end extension 112 which is received within a hole at the inboard side of the wheel, and an outboard engagement portion 114 which engages the surface of the wheel and includes a through opening 116 through which extends a bolt which in combination with a nut attaches the drive key to the aircraft wheel. Drive key 110 is coated with a tungsten carbide composition 22 on side portions 118 and the entire drive key 110 is thereafter coated with a ceramic-metallic composition 24 as described above.

A rotor drive key coated as described above was tested as follows.

EXAMPLE 1

First, a steel drive key having a tungsten-carbide cobalt coating on its side portions and a ceramic-metallic coating over the entire drive key was installed and removed from a wheel five times to score the protective coating. Next, the drive key was subjected to five days of salt-fog testing. After the five day test, the drive key did not exhibit any noticeable degradation of the protective coating or any corrosion of the steel drive key.

EXAMPLE 2

Steel drive keys according to the above-described embodiment of the present invention were installed in an aircraft wheel and subjected to one tour of duty, comprising approximately 200 landings, in a brake system having carbon-carbon rotors and stators. The drive keys were removed after the tour of duty and examined. It was noted that the ceramic-metallic coating had been damaged, in some locations, exposing the steel below. However, none of the exposed steel exhibited any rust or corrosion due to the sacrificial action of the ceramic-metallic coating. The coating was repaired using additional ceramic-metallic compound and the key returned to service.

The present invention has been described in terms of several preferred embodiments. Modifications and additions to these embodiments will become apparent to those skilled in the relevant arts upon a reading of the foregoing description. It is intended that all such modifications and additions comprises a part of the present invention to the extent they fall within the scope of the several claims appended hereto.

What is claimed is:

1. A process for providing a steel member having corrosion and wear resistance through a combination of coatings, comprising the steps of:
   cleaning a steel member to remove undesirable materials therefrom;
   thermally spraying the steel member with a tungsten carbide-cobalt composition to provide a coating of tungsten carbide-cobalt, the tungsten carbide-cobalt composition comprising approximately 78-90% sintered tungsten carbide and approximately 10-19% cobalt;
   cleaning the steel member and tungsten carbide-cobalt coating;
   providing a sacrificial ceramic-metallic coating on the steel member, whereby the tungsten carbide-cobalt coating provides wear and corrosion resistance and the ceramic-metallic coating provides corrosion resistance for the steel member;
   mounting the steel member on an aircraft wheel; and
   repairing minor damage to the ceramic-metallic coating while the steel member is mounted on the aircraft wheel.

2. A process for providing a steel member having corrosion and wear resistance through a combination of coatings, comprising the steps of:
   cleaning a steel member to remove undesirable materials therefrom;
   thermally spraying the steel member with a tungsten carbide-cobalt composition to provide a coating of tungsten carbide-cobalt, the tungsten carbide-cobalt composition comprising approximately 78-90% sintered tungsten carbide and approximately 10-19% cobalt;
   cleaning the steel member and tungsten carbide-cobalt coating;
   providing a sacrificial ceramic-metallic coating on the steel member, whereby the tungsten carbide-cobalt coating provides wear and corrosion resistance and the ceramic-metallic coating provides corrosion resistance for the steel member;
   mounting the steel member on an aircraft wheel;
   removing the steel member from the aircraft wheel; and
   repairing minor damage to the ceramic-metallic coating.

* * * * *